(12) United States Patent
Dwivedi

(10) Patent No.: US 12,522,454 B1
(45) Date of Patent: Jan. 13, 2026

(54) AUTOMATED UNLOADING OF PACKAGES FROM TRAILERS

(71) Applicant: Amazon Technologies, Inc., Seattle, WA (US)

(72) Inventor: Rajeev Dwivedi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 496 days.

(21) Appl. No.: 18/063,432

(22) Filed: Dec. 8, 2022

(51) Int. Cl.
*B65G 67/24* (2006.01)

(52) U.S. Cl.
CPC .................... *B65G 67/24* (2013.01)

(58) Field of Classification Search
CPC ........ B65G 67/08; B65G 67/24; B65G 59/04; B65G 47/1485; B65G 47/265; B65G 47/266; B65G 47/50; B65G 47/57; B65G 47/647; B65G 47/905; B65G 47/91; B65G 47/912; B65G 47/914; B65G 47/917; B65G 47/067; B65G 21/2027; B65G 21/2036; B65G 17/28; B65G 17/323; B65G 17/48; B65G 2201/0235; B65G 2201/025; B25J 15/0616; B25J 15/065; B25J 13/087; B25J 13/088; B66C 1/0237; B66C 1/0243; B66C 1/0256
See application file for complete search history.

(56) References Cited

U.S. PATENT DOCUMENTS

| | | | |
|---|---|---|---|
| 10,099,867 B2 | 10/2018 | Ge et al. | |
| 11,034,530 B1* | 6/2021 | Narayanan ........... | B65G 1/0492 |
| 2014/0341695 A1* | 11/2014 | Girtman ................. | B65G 67/24 |
| | | | 414/797 |
| 2015/0274447 A1* | 10/2015 | McCollum ............. | B65G 57/03 |
| | | | 414/796.2 |
| 2017/0305694 A1* | 10/2017 | McMurrough ......... | G06T 17/10 |
| 2018/0134501 A1* | 5/2018 | Ge .......................... | B65G 67/24 |
| 2022/0097243 A1* | 3/2022 | Makhal .................. | B65G 67/24 |
| 2023/0062676 A1* | 3/2023 | Patil ....................... | B25J 9/0084 |
| 2024/0217761 A1* | 7/2024 | Criswell ................ | B25J 9/1687 |

OTHER PUBLICATIONS

Honeywell Intelligrated. (Apr. 17, 2019). Robotic Unloader | Honeywell Intelligrated [Video]. YouTube. https://www.youtube.com/watch?v=SSfhnbKOkKk.
Remote Under Belt Unloading System (RUBUS). Dec. 8, 2022. The Industry that Makes Supply Chains Work. https://videos.mhi.org/remote-under-belt-unloading-system-rubus.

* cited by examiner

*Primary Examiner* — Glenn F Myers
(74) *Attorney, Agent, or Firm* — Eversheds Sutherland (US) LLP

(57) ABSTRACT

Systems and methods are disclosed for automated unloading of packages from trailers. In one embodiment, an example package unloading system may include a suction cup support having a first suction cup assembly and a second suction cup assembly, a moveable frame coupled to the suction cup support, a telescoping conveyor configured to convey packages downstream, an angled conveyor configured to convey the packages to the telescoping conveyor, and a controller configured to cause the moveable frame to move the suction cup support to a first vertical position, and cause the first suction cup assembly to engage a first package.

20 Claims, 7 Drawing Sheets

AUTOMATED UNLOADING OF PACKAGES FROM TRAILERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
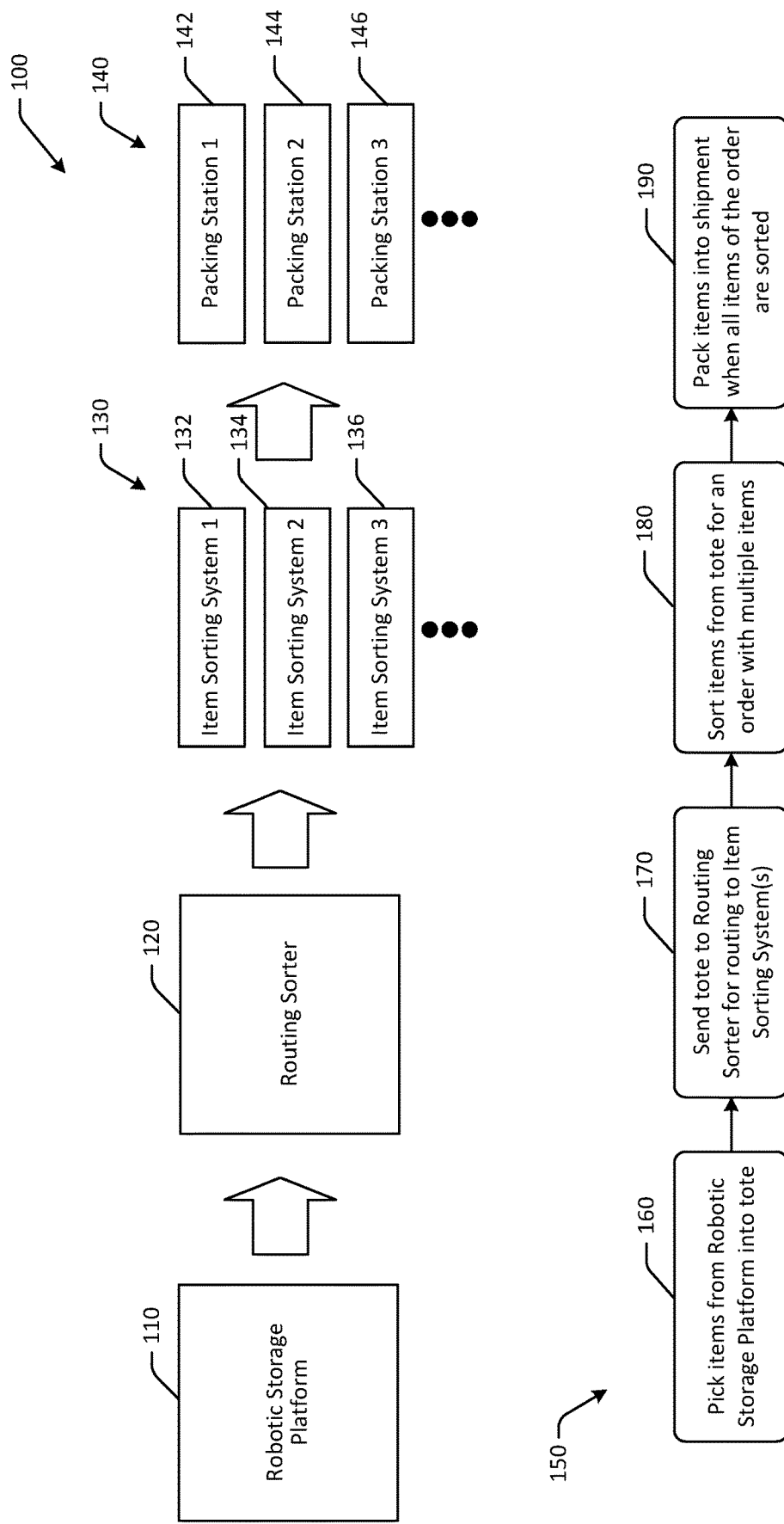
FIG. 1 is a hybrid schematic illustration of an example use case for automated unloading of packages from trailers and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into packages for transport, sortation, etc., the packages may be placed or loaded onto a truck and/or into a trailer, such as a semi-trailer of a semi-trailer truck (e.g., having a standard width in the U.S. of 8.5 feet, etc.) and transported to another facility. This may allow for increased efficiency and reduced handling of individual packages, and may also provide the ability for packages to be transported across any number of facilities and/or workstations within a facility.

Once the packages arrive at a destination, the packages may be unloaded from a truck or trailer. Manual unloading of the packages may be a time consuming process. In addition, if packages are dumped on top of each other, damage to one or both the package or item contained inside may occur if a heavy package falls on a smaller or soft package, etc. In another example, if a heavy package or heavy item falls onto a soft or fragile package or item, the soft or fragile item may be damaged. In addition, depending on a speed of unloading, items or packages may fall off sides of a conveyor. Accordingly, controlled unloading or automated unloading of packages may be desired, so as to reduce risk of damage to items, risk of overflow from conveyors or other surfaces, improve efficiency, and so forth.

Embodiments of the disclosure include package unloading systems that allow for quick and automated removal of packages from trailers in a controlled manner, so as to reduce mechanical impact and enhanced singulation (e.g., spacing on a takeaway conveyor between individual items, etc.). Some embodiments automate the process for unloading stacked packages from the trailer or container of a delivery vehicle at a materials handling facility. A materials handling facility may be a sort center, shipping center, packing center, distribution center, or other shipping, handling, or packing facility, among similar facilities. At materials handling facilities, carrier vehicles may deliver packages of inventory, prepackaged orders, and/or other types of packages. For example, at a sort center, prepared customer packages may be received for additional sorting according to destination (e.g., zip code, city, state) prior to the final shipment. Typically, as vehicles carrying containers arrive at materials handling facilities, workers manually unload packages from the containers. By automating the unloading of packages at the materials handling facilities, efficiency can be improved. The automated package unloading system of the present disclosure is able to efficiently unload the multiple layers of packages stacked in the trailer or container received at the materials handling facility onto a mobile conveyor system which transports the packages to additional downstream processes (e.g., sorting, storing, shipping, etc.).

Additionally, unlike other types of robotic systems that utilize expensive 6-axis robotic arms to unload packages, embodiments may have moveable frames that provide movement along 2-axes and/or utilize no more than 3 motors for movement, thereby providing a cost effective implementation and reduced mechanical complexity. Some embodiments include suction cup assemblies that are conformal vacuum probes, so as to avoid dependency on computer vision systems. A heavy flexible curtain may be attached at fixed distance from suction cup support. As packages are unloaded and travel downwards, the flexible curtain guides the packages and breaks the speed of the package intermittently to reduce impact and therefore reduce damage to the package. Since the heavy flexible curtain can guide the package to bottom with diminished damage to the package, the height of takeaway belt need not be adjusted. The takeaway system may include a funnel to guide multiple packages to reduce stream width. A matrix belt at the bottom can be actuated in sequence to prevent the packages from jamming.

Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for package unloading systems for various container types and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers or other types of containers for shipment to another fulfillment center, a sort center, or another facility. At the subsequent facility, the container may be dumped to remove its contents. At various points throughout the facility, totes, carts, boxes, Gaylords, and/or other types of containers may be unloaded by the package unloading systems described herein.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
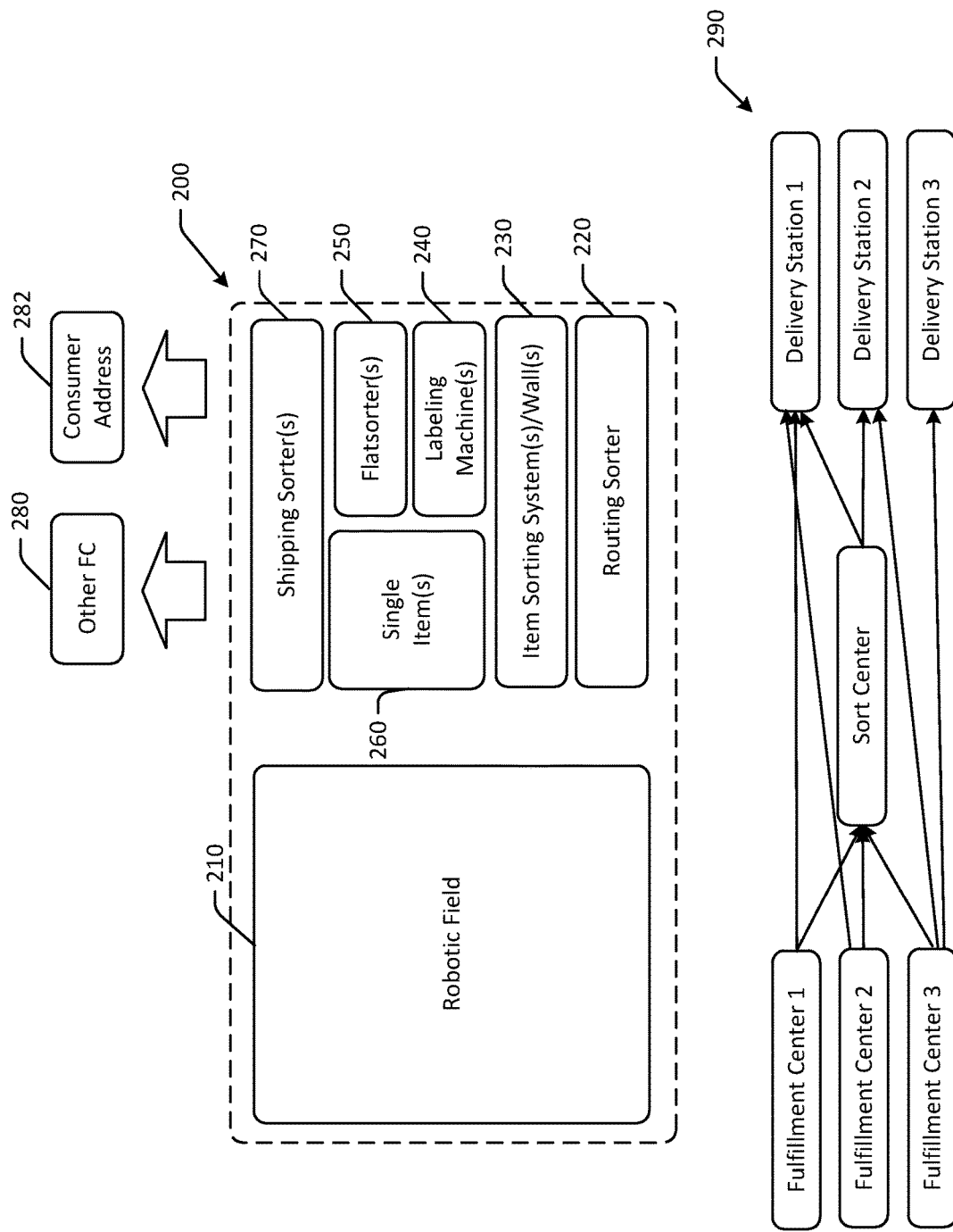
FIG. 2 is a hybrid schematic illustration of an example use case for automated unloading of packages from trailers in accordance with one or more embodiments of the disclosure.

FIG. 2 is a hybrid schematic illustration of an example use case for automated unloading of packages from trailers in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments described herein may be configured to unload packages at various facilities from trailers, trucks, or other structures. At various points along the network of facilities, packages may be unloaded using the package unloading systems described herein.

Embodiments of the disclosure include package unloading systems for various package types. The package unloading systems may be configured to unload more than one package type, and may be configured to automatically unload contents of a trailer using controlled conveyor operation. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
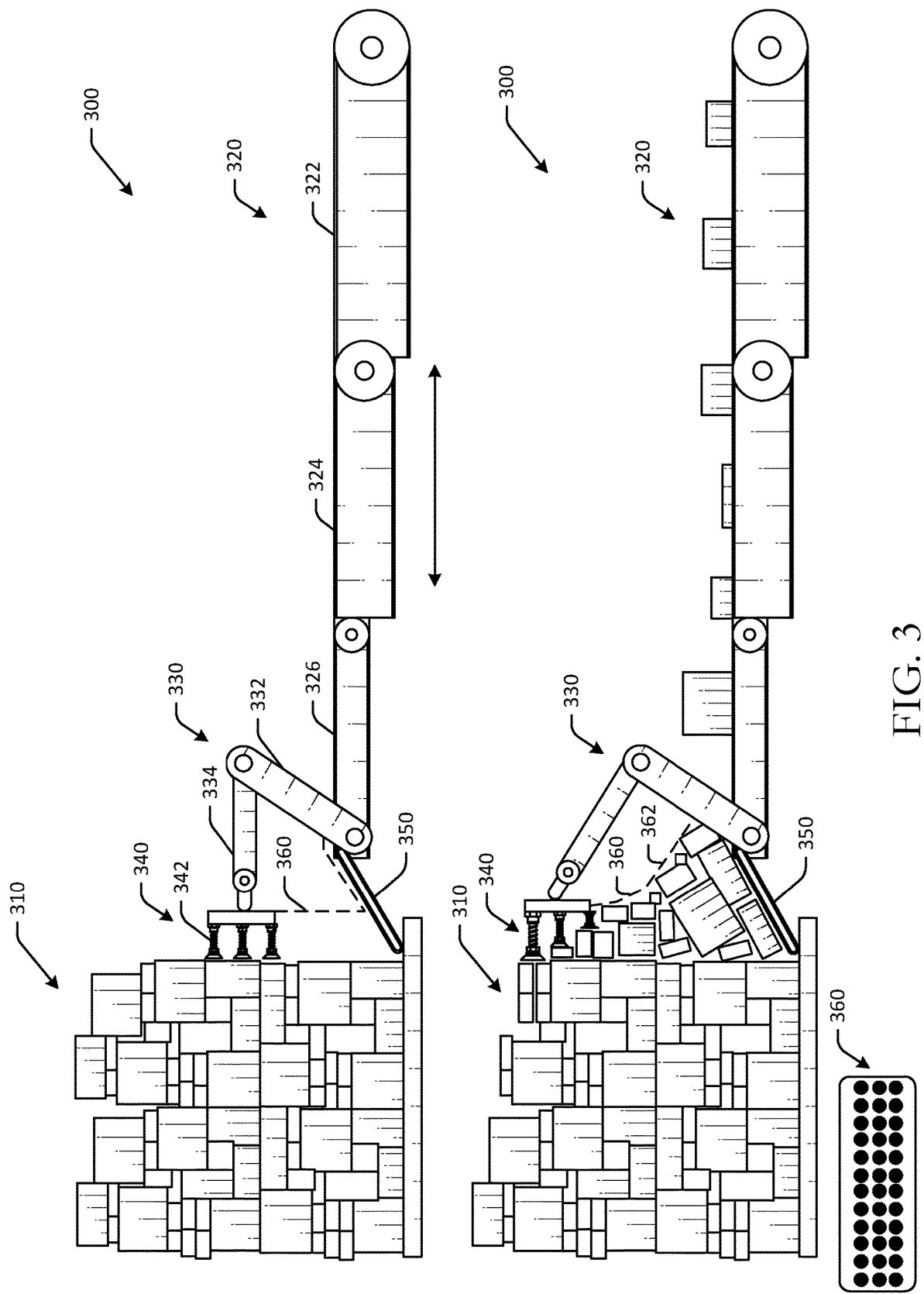
FIG. 3 is a schematic illustration of a package unloading system used for automated unloading of packages in accordance with one or more embodiments of the disclosure.

FIG. 3 is a schematic illustration of a package unloading system 300 used for automated unloading of packages in accordance with one or more embodiments of the disclosure. Other embodiments may include additional or fewer components. The illustration of FIG. 3 is not to scale, and may not be illustrated to scale with respect to other figures. Package types in addition to, or other than, the box-like structures shown in the example of FIG. 3 may be unloaded using the package unloading systems described herein.

In FIG. 3, the package unloading system 300 may be used to automatically unload packages 310 from a trailer or other location. The package unloading system 300 may include a telescoping conveyor 320. The telescoping conveyor 320 may be used to extend further into trailers as packages are unloaded. The telescoping conveyor 320 may therefore move back and forth in the directions illustrated in FIG. 3. The telescoping conveyor 320 may be configured to convey packages that are unloaded downstream. The telescoping conveyor 320 may include one or more telescoping portions, such as a first portion 322, a second portion 324 that moves relative to the first portion 322, a third portion 326 that moves relative to the second portion 324, and so forth. Any number of telescoping portions may be included and may be used to adjust a distance that the package unloading system 300 can extend from a facility dock or other location. The telescoping portions of the telescoping conveyor 320 may retract underneath each other and/or in a vertically aligned position when retracted, and may extend such that the conveyors for each portion are horizontally aligned, as depicted in the example of FIG. 3.

The package unloading system 300 may include a moveable frame 330. The moveable frame 330 may be coupled to a suction cup support 340, and may be configured to move the suction cup support 340 in a vertical direction. In some embodiments, the moveable frame 330 may not be a 6-axis robot and instead may have no more than 2 degrees of freedom. In other embodiments, the moveable frame 330 may be configured to move about no more than 2 axes, such as in a vertical direction (Z-axis) and a back and forth direction (X-axis) aligned with the back and forth movement of the telescoping conveyor 320 (e.g., the arrows depicted in FIG. 3). The moveable frame 330 may include no more than three motors in some embodiments. The moveable frame 330 may include a first member 332 disposed on a first side of the telescoping conveyor 320, and an optional second member disposed on a second side of the telescoping conveyor 320. A cross member may be disposed between the first member 332 and the second member, where the suction cup support 340 may be coupled to the cross member. Accordingly, the moveable frame 330 may be coupled to the third portion 326 of the telescoping conveyor 320, and may therefore move with respect to the second portion 324 and the first portion 322 of the telescoping conveyor 320. The moveable frame 330 and suction cup support 340 may therefore extend into the trailer via actuation of the telescoping conveyor 320. The package unloading system 300 may be configured to enter a semi-trailer having a width of 8.5 feet, and therefore a width of the telescoping conveyor 320 and/or moveable frame 330 may be less than 8.5 feet in some embodiments. In the example of FIG. 3, the moveable frame 330 may include a third member 334 coupled to the first member 332, where the third member 334 is configured to rotate with respect to the first member 332, and the third member 334 may be coupled to the cross member and/or directly to the suction cup support 340.

The suction cup support 340 may support a number of suction cup assemblies 342 that may be conformal vacuum probes. For example, the suction cup support 340 may support a first suction cup assembly and a second suction cup assembly, where the first suction cup assembly and the second cup assembly are retractable suction cup assemblies configured to retract from a first position, such as an extended position to a second position, such as a retracted position. In FIG. 3, a top suction cup assembly is shown in an extended position and a bottom suction cup assembly is shown in a retracted position. Retraction of suction cup assemblies may be performed sequentially to assist in the unloading of packages, where a top row of suction cup assemblies may be engaged and/or retracted before a bottom row of suction cup assemblies.

The package unloading system 300 may include a curtain 360 coupled to the suction cup support 340, and configured to slow a speed of packages falling from upper portions of the trailer. The curtain 360 may be configured to guide packages onto an angled conveyor 350 of the package unloading system 300. The curtain 360 may have a first length that is greater than a distance between the suction cup support 340 and the angled conveyor 350 when the suction cup support 340 is disposed at a maximum height position, so as to ensure packages move under the curtain prior to being directed onto the telescoping conveyor 320. The curtain 360 may be formed of a low friction material and/or have a low friction coating, such as a plastic or composite material. In some embodiments, the curtain 360 may include one or more sets of rollers disposed along a front face of the curtain 360 as depicted in the front view of the curtain 360 in FIG. 3, where the rollers may facilitate the movement of packages under the curtain on onto the telescoping conveyor 320.

The package unloading system 300 may include the angled conveyor 350. The angled conveyor 350 may be a knife edge conveyor having a thickness of less than 1 inch, and may be coupled to the third portion 326 of the telescoping conveyor 320. The angled conveyor 350 may have a fixed position relative to the third portion 320 of the telescoping conveyor 320 and may be configured to convey packages to the telescoping conveyor 320. The angled conveyor 320 may be disposed at a non-horizontal angle, such as a declining angle (e.g., −45 degrees, etc.), relative to the telescoping conveyor 320. The angled conveyor 350 may be used to collect packages from a floor surface of the trailer and guide the packages to the telescoping conveyor 320.

The package unloading system 300 may include a controller configured to cause the moveable frame 330 to move the suction cup support 340 to a first vertical position, and cause the first suction cup assembly 342 to engage a first package. As discussed with respect to FIGS. 4-5, operation of the suction cup assemblies and positioning of the suction cup support may be controlled to improve efficiency of package unloading.

In FIG. 3, the automated package unloading system 300 may therefore be used to unload stacked packages 310 from a container and/or trailer of a vehicle (e.g., delivery truck) onto the telescoping conveyor system 320. The packages 310 may be packed and stacked into the vehicle (e.g., vehicle trailer, container, etc.) extending the width, length, and depth of the trailer or container of the vehicle. The packages 310 may include boxes, pails, containers, special packaging envelopes, and/or any other type of packaging.

Figure 4:
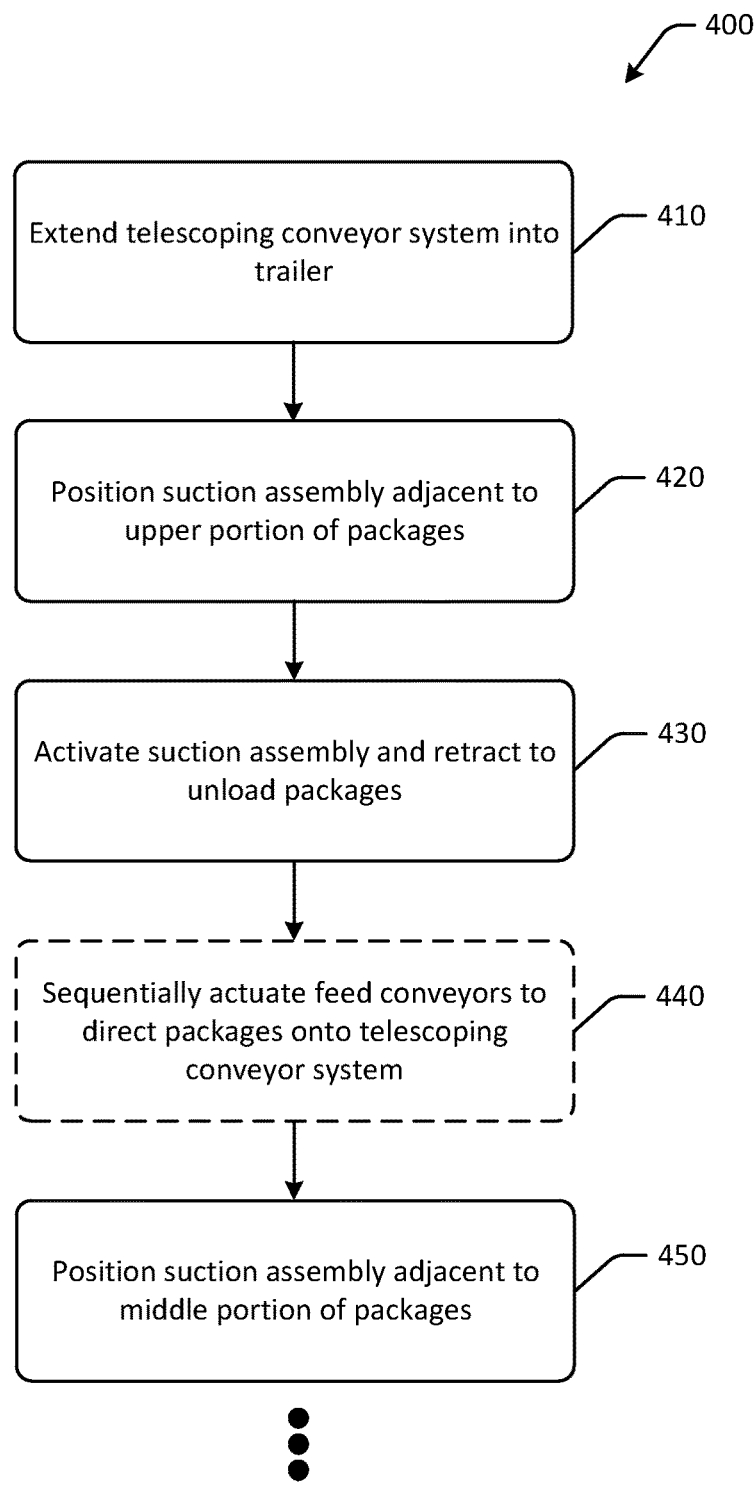
FIG. 4 is a schematic illustration of an example process flow for automated unloading of packages from trailers in accordance with one or more embodiments of the disclosure.

FIG. 4 is a schematic illustration of an example process flow 400 for automated unloading of packages from trailers in accordance with one or more embodiments of the disclosure. Other embodiments may include additional or fewer components. The operations of FIG. 4 may be performed by one or more computer systems, such as a controller of a package unloading system. One or more of the operations may be optional and/or may be performed in a different sequence than that depicted in the example of FIG. 4. Some of the operations may be performed at least partially concurrently. The process flow 400 may be performed in conjunction with any of the dumpers described with respect to FIGS. 1-3.

Execution of the operations of the process flow 400 may be performed to unload or packages from a trailer onto a conveyor surface, such as a takeaway conveyor in a controlled manner. Some embodiments may utilize additional and/or different operations.

At block 410, a controller in communication with (or integrated with) a package unloading system may be configured to cause a telescoping conveyor system to extend into a trailer. For example, the package unloading system may be aligned with the trailer at an unloading dock, and the telescoping conveyor system may be extended into the trailer to begin unloading of packages.

At block 420, the controller may cause one or more suction cup assemblies of the package unloading system to be positioned adjacent to the upper portion or top level of packages. For example, the controller may cause the moveable frame to position the suction cup support at a maximum height inside the trailer. Due to the standard nature of trailer dimensions, the maximum height may be pre-programmed.

At block 430, the controller may cause one or more suction cup assemblies to be activated for vacuum flow, and retracted to unload packages by pulling the packages toward the telescoping conveyor system of the package unloading system. For example, a first suction cup assembly may be disposed in an upper row of the suction cup support, and a second cup assembly may be disposed in a lower row of the suction cup support. The controller may be configured to determine that the first suction cup assembly is engaged, determine that the second suction cup assembly is engaged, cause the first suction cup assembly to retract from the first position to the second position, and cause the second suction cup assembly to retract from the first position to the second position after the first suction cup assembly is retracted to the second position. The controller may optionally cause the first suction cup assembly to extend from the second position to the first position while the second suction cup assembly is in the second position, as depicted in the lower drawing of FIG. 3.

At optional block 440, the controller may sequentially actuate feed conveyors or angled conveyor(s) to direct packages onto the telescoping conveyor system. For example, some packages may fall onto a floor of the trailer, and such packages may be elevated from a floor of the trailer to the telescoping conveyor system via a feed conveyor or angled conveyor. As discussed with respect to FIG. 6, such conveyors may have more than one laterally adjacent segment, and the controller may sequentially actuate individual conveyors to prevent package jams by only directing a portion of packages onto the telescoping conveyor at a time.

At block 450, the controller may cause the suction cup assemblies to be positioned adjacent to a middle portion of packages. For example, the controller may cause the moveable frame to position the suction cup support at a medium height inside the trailer. Due to the standard nature of trailer dimensions, the maximum height may be pre-programmed. As packages are unloaded, the suction cup support may work its way downwards, and then further into, a trailer until unloading is complete.

Figure 5:
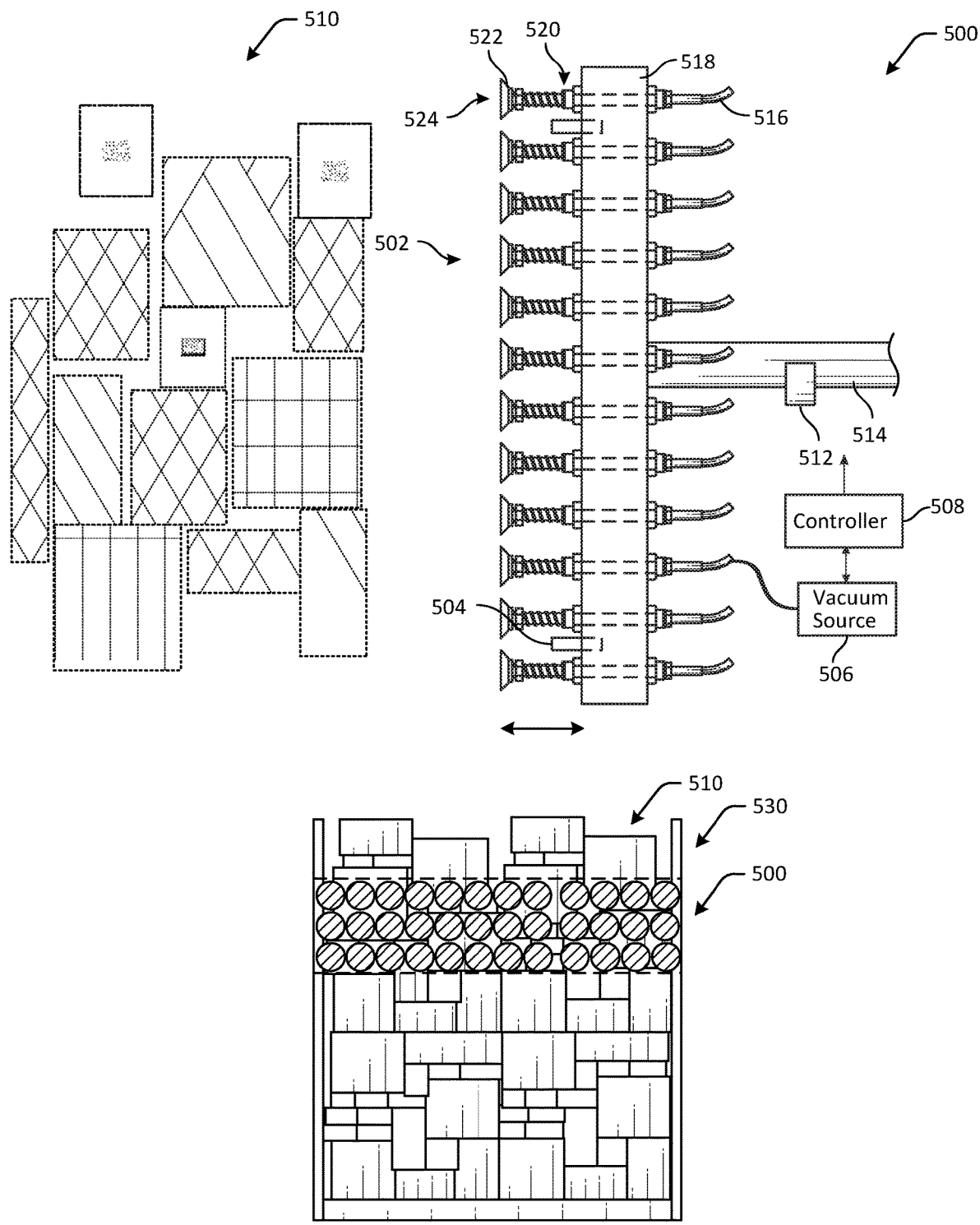
FIG. 5 is a schematic illustration of various components of a package unloading system in accordance with one or more embodiments of the disclosure.

FIG. 5 is a schematic illustration of various components of a package unloading system in accordance with one or more embodiments of the disclosure. Other embodiments may include additional or fewer operations. The illustration of FIG. 5 may not be to scale, and may not be illustrated to scale with respect to other figures. The example components illustrated in FIG. 5 may be the same or different components than those discussed with respect to FIGS. 1-4.

In FIG. 5, the package unloading system may be a system configured to unload packages 510 from a trailer 530. The system may have a suction cup support 500 that extends a majority of the width of the trailer 530, as shown in the rear view of FIG. 5. The system may have a first suction cup assembly and a second suction cup assembly, a moveable frame coupled to the suction cup support, the moveable frame configured to move the suction cup support in a vertical direction, a telescoping conveyor configured to convey packages downstream, and an angled conveyor configured to convey the packages to the telescoping conveyor, where the angled conveyor is disposed at a declining angle relative to the telescoping conveyor. The system may include a curtain coupled to the suction cup support, the curtain configured to guide packages onto the angled conveyor. The curtain can have a first length that is greater than a distance between the suction cup support and the angled conveyor when the suction cup support is disposed at a maximum height position.

The system may have an end effector, such as the suction cup support 340, and may include gripping components 524, such as the suction cup assemblies, mounted to a manifold plate. The suction cup assemblies may include a gripping interface coupled to a spring-loaded compensator 520 which is inserted through a respective manifold plate bore and securely fastened to the manifold plate 518. The spring-loaded compensator 520 may be used to compensate for uneven layers of packages 510. For example, assume that a layer of packages 510 comprises four different sized boxes. Further, assume that the face of the layer of packages 510 is uneven due to the different positioning and/or size of the packages 510. By having each gripping interface 522 coupled to a separate spring-loaded compensator 520, the position of individual gripping components 524 can vary to compensate for the unevenness of the layer of packages 510. It should be noted that while the gripping interface 522 of FIG. 5 illustrates a bellow suction cup, the gripping interface 522 may comprise a foam member, an electrostatic plate, an adhesive material, and/or any other suitable interface that could be used to securely attach to a package 522 for unloading from the trailer 530 or other vehicle. In some embodiments, each gripping component 524 may comprise an actuator device (e.g., pneumatic, hydraulic, electrical, etc.) that could provide additional degrees of freedom for movement of the gripping interface 522 as can be appreciated.

A vacuum hose 516 may extend from a distal end of the gripping component 524 which extends outwardly from a back side of the manifold plate 518. The vacuum hose 516 is used to couple the gripping component 524 to a vacuum source 506 for providing the vacuum pressure needed to attach each gripping component 524 to a package 510. In some embodiments, the vacuum source 506 generates a substantially even amount of vacuum pressure at each of the vacuum hoses 516. In other embodiments, the vacuum source 506 may be configured to limit the vacuum pressure through one or more of the vacuum hoses 516. For example, if one of the gripping components 524 will not engage with a package, the vacuum source 506 may be configured to limit vacuum pressure to that specific gripping component 524.

A horizontal arm 514 may be coupled to the end effector 502 (in some embodiments the suction cup support 500 itself may be the end effector). In some embodiments, the horizontal arm 216 may comprise a sensor(s) 512. The sensor 512 may comprise any type of sensor that is capable of sensing the presence and/or position of one or more packages 510 moving on a portion of the underlying conveyor system 109. The sensor 512 may be in data communication with the controller 508. In some embodiments, if the sensor 512 does not detect a presence of a package 510 after a predetermined amount of time, the controller 508 may determine that the prior layer of packages has been unloaded and that the end effector 502 may be repositioned to grasp the next layer of packages 510 for unloading.

The vacuum source 506 can include any type of vacuum generator and/or vacuum pump that is capable of providing the amount of the vacuum pressure needed to create a suction for attaching the gripping components 524 to the face of the packages 510. The vacuum source 506 is coupled to the gripping components 524 via a vacuum hose 516.

The controller(s) 508 can be any suitable computing or processing device configured to perform processing tasks and/or control operation of equipment. In particular, the controller(s) 508 can be configured to process and/or transmit data as can be collected from the end effector sensors 504 and/or the conveyor sensors 512. For example, the controller(s) 508 can be configured to determine a distance between the end effector 502 and a detected layer of packages 510 according to an analysis of the data collected from the end effector sensors 504. In another example, the controller(s) 508 can be configured to determine whether any additional packages 510 are on the conveyor system 109 that could interfere with the operation of the automated package unloading system 100 using data collected from the conveyor sensor(s) 512. For example, if the controller(s) 508 determines that there are no more packages 510 on a particular portion of the conveyor system 109, the controller(s) 508 may be configured to determine that the automated package unloading system 100 can be operated to unload additional packages 510 from the container. However, if the controller 508, via the data received from the conveyor sensor(s) 512 determines that packages 510 are present on the portion of the conveyor system 109, the controller(s) 508 may wait a determined time before initiating further operation of the automated package unloading system 100. For example, the controller(s) 508 may wait a predetermined amount of time between detection of a package 510 on the portion of the conveyor system 109.

In addition, the controller(s) 508 can be configured to communicate with the vacuum source 506 and control activation and/or termination of the vacuum pressure to the gripping components 524. For example, the controller 508 can be configured to direct the vacuum source 506 to begin generating the vacuum pressure needed to attach the gripping components 524 to the face of the packages 510 when the end effector 502 has been moved to the required position for attachment. In another non-limiting example, the controller 508 can be configured to direct the vacuum source 506 to terminate generation of the vacuum pressure, thereby causing release of the packages 510 from the end effector 502 and onto the underlying conveyor system 109.

The controller(s) 508 can further be configured to operate the various components of the automated package unloading system 100. For example, in some embodiments, the controller 508 can be configured to operate the horizontal arms 514 which in turn can move the end effector 502 in the forward and/or backward directions. For example, the controller 508 can be configured to control the movement of the horizontal arms 514 in the backward and forward directions allowing the end effector 502 to engage with the packages 510 and pull the packages 510 from the original position and onto the conveyor system.

According to various embodiments, the controller 508 can be configured to operate the conveyor system 109. For example, assuming the conveyor system 109 is a telescoping conveyor, the controller 508 can be configured to operate the telescoping behavior of the conveyor system 109. Specifically, the conveyor system 109 can be configured to control the movement of the conveyor system 109 into and out of the vehicle 106.

Figure 6:
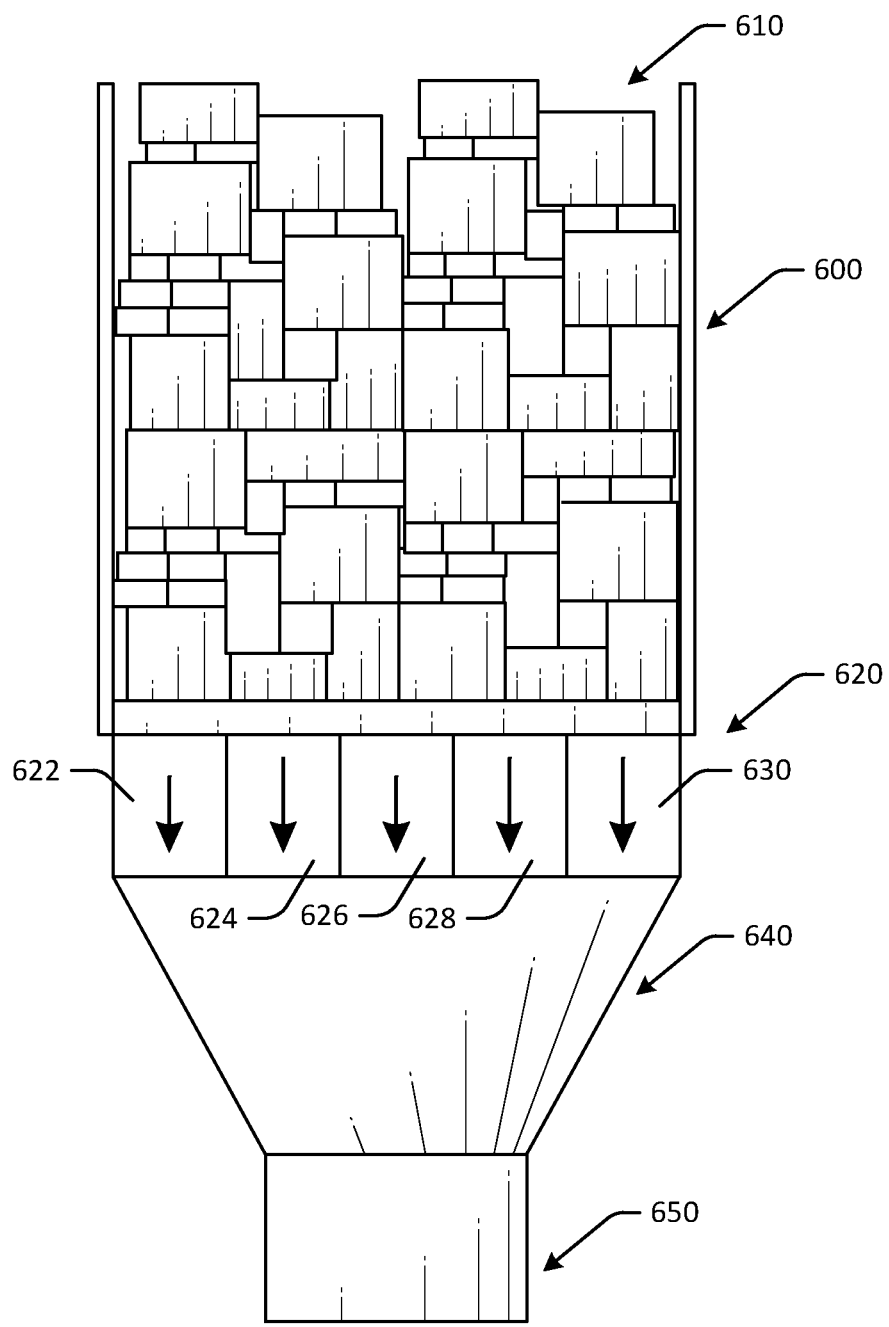
FIG. 6 is a schematic illustration of a conveyor system for automated unloading of packages in accordance with one or more embodiments of the disclosure.

FIG. 6 is a schematic illustration of a conveyor system for automated unloading of packages in accordance with one or more embodiments of the disclosure. Other embodiments may include additional or fewer components. The illustrations of FIG. 6 may not be to scale, and may not be illustrated to scale with respect to other figures. The components illustrated in FIG. 6 may be used with any of the package unloading systems discussed with respect to FIGS. 1-5.

In the top view depicted in FIG. 6, a package unloading system may be used to unload packages 610 from a trailer 600. The package unloading system may include a telescoping conveyor 650, a funnel 640, and an angled conveyor system 620. The angled conveyor system 620 may be configured to convey the packages to the telescoping conveyor 650 via the funnel 640. In particular, the angled conveyor system 620 may guide packages from a floor of the trailer to the telescoping conveyor 650. In some embodiments, the angled conveyor system 620 may include more than one conveyor portion that can be individually actuated, such as a first conveyor 622, a second conveyor 624, a third conveyor 626, a fourth conveyor 628, a fifth conveyor 630, and so forth. Any number of conveyors may be included. The different conveyors may be disposed laterally adjacent to each other and some or all of the conveyors may be actuated independently.

The controller may be configured to sequentially actuate individual conveyors so as to prevent jams from several packages being directed to the funnel at the same time from both sides of the trailer. For example, the controller may be configured to cause the first conveyor 622 to be actuated for a first duration, and cause the second conveyor 624 to be actuated after the first duration. In other embodiments, the edge conveyors may be actuated at the same time, and then the middle conveyors may be actuated. Such actuation may improve singulation and separation of items and reduce a likelihood of jams. The packages may move through the funnel 640 and onto the telescoping conveyor 650.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
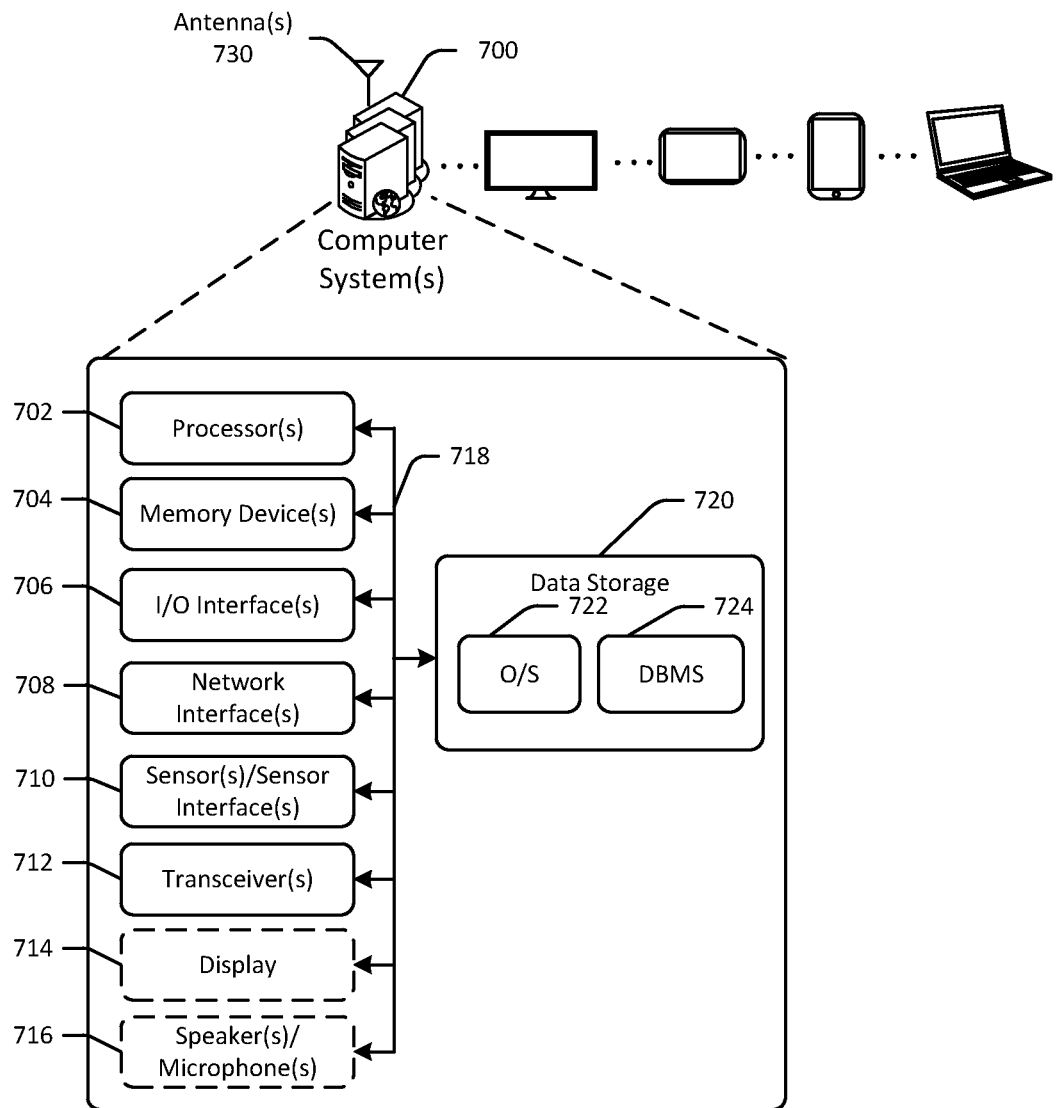
FIG. 7 schematically illustrates an example architecture of a computer system associated with a package unloading system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer, a content streaming device; or the like. The computer system(s) 700 may correspond to an illustrative device configuration for a computer system used in conjunction with any one of the container or package unloading system(s) of FIGS. 1-6, such as suction assemblies, robotic mechanisms, and/or conveyor devices.

The computer system(s) 700 may be configured to communicate with one or more servers, user devices, or the like. The computer system(s) 700 may be configured to cause the package unloading system(s) to actuate one or more conveyors, actuate one or more suction cup assemblies, retrieve containers, transport containers, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A package unloading system comprising:
a suction cup support comprising a first suction cup assembly and a second suction cup assembly, wherein the first suction cup assembly and the second cup assembly are retractable suction cup assemblies configured to retract from a first position to a second position;
a moveable frame coupled to the suction cup support, the moveable frame configured to move the suction cup support in a vertical direction;
a telescoping conveyor configured to convey packages downstream;
an angled conveyor configured to convey the packages to the telescoping conveyor, wherein the angled conveyor is disposed at a declining angle relative to the telescoping conveyor;
a curtain coupled to the suction cup support, the curtain configured to guide packages onto the angled conveyor, wherein the curtain has a first length that is greater than a distance between the suction cup support and the angled conveyor when the suction cup support is disposed at a maximum height position; and
a controller configured to:
cause the moveable frame to move the suction cup support to a first vertical position; and
cause the first suction cup assembly to engage a first package.

2. The package unloading system of claim 1, wherein the telescoping conveyor comprises a first portion and a second portion that moves relative to the first portion; and
wherein the moveable frame is coupled to the second portion of the telescoping conveyor, such that the moveable frame moves with respect to the first portion.

3. The package unloading system of claim 1, wherein the moveable frame comprises:
a first member disposed on a first side of the telescoping conveyor;
a second member disposed on a second side of the telescoping conveyor; and
a cross member disposed between the first member and the second member, wherein the suction cup support is coupled to the cross member.

4. The package unloading system of claim 1, wherein the first suction cup assembly is disposed in an upper row of the suction cup support, and the second cup assembly is disposed in a lower row of the suction cup support, and wherein the controller is further configured to:
determine that the first suction cup assembly is engaged;
determine that the second suction cup assembly is engaged;
cause the first suction cup assembly to retract from the first position to the second position; and
cause the second suction cup assembly to retract from the first position to the second position after the first suction cup assembly is retracted to the second position.

5. The package unloading system of claim 4, wherein the controller is further configured to:
cause the first suction cup assembly to extend from the second position to the first position while the second suction cup assembly is in the second position.

6. The package unloading system of claim 1, wherein the angled conveyor comprises:
a first conveyor; and
a second conveyor disposed laterally adjacent to the first conveyor, wherein the second conveyor is configured to be actuated independent of the first conveyor.

7. The package unloading system of claim 6, wherein the controller is further configured to:
cause the first conveyor to be actuated for a first duration; and
cause the second conveyor to be actuated after the first duration.

8. The package unloading system of claim 1, wherein the angled conveyor has a thickness of less than 1 inch.

9. The package unloading system of claim 1, wherein the moveable frame is configured to move along no more than 2 axes.

10. The package unloading system of claim 1, wherein the package unloading system is configured to enter a semi-trailer having a width of 8.5 feet.

11. A system comprising:
a suction cup support comprising a first suction cup assembly and a second suction cup assembly;
a moveable frame coupled to the suction cup support, the moveable frame configured to move the suction cup support in a vertical direction;
a telescoping conveyor configured to convey packages downstream;
an angled conveyor configured to convey the packages to the telescoping conveyor, wherein the angled conveyor is disposed at a declining angle relative to the telescoping conveyor; and
a curtain coupled to the suction cup support, the curtain configured to guide packages onto the angled conveyor;
wherein the curtain has a first length that is greater than a distance between the suction cup support and the angled conveyor when the suction cup support is disposed at a maximum height position.

12. The system of claim 11, further comprising:
a controller configured to:
cause the moveable frame to move the suction cup support to a first vertical position; and
cause the first suction cup assembly to engage a first package.

13. The system of claim 11, wherein the telescoping conveyor comprises a first portion and a second portion that moves relative to the first portion; and
wherein the moveable frame is coupled to the second portion of the telescoping conveyor, such that the moveable frame moves with respect to the first portion.

14. The system of claim 11, wherein the moveable frame comprises:
a first member disposed on a first side of the telescoping conveyor;
a second member disposed on a second side of the telescoping conveyor; and a cross member disposed between the first member and the second member, wherein the suction cup support is coupled to the cross member.

15. The system of claim 11, wherein the angled conveyor comprises:
   a first conveyor; and
   a second conveyor disposed laterally adjacent to the first conveyor, wherein the second conveyor is configured to be actuated independent of the first conveyor.

16. A package unloading system comprising:
   a suction cup support comprising a first suction cup assembly and a second suction cup assembly, wherein the first suction cup assembly and the second cup assembly are retractable suction cup assemblies configured to retract from a first position to a second position;
   a moveable frame coupled to the suction cup support, the moveable frame configured to move the suction cup support in a vertical direction, wherein the moveable frame comprises:
      a first member disposed on a first side of the telescoping conveyor;
      a second member disposed on a second side of the telescoping conveyor; and
      a cross member disposed between the first member and the second member, wherein the suction cup support is coupled to the cross member;
   a telescoping conveyor configured to convey packages downstream;
   an angled conveyor configured to convey the packages to the telescoping conveyor, wherein the angled conveyor is disposed at a declining angle relative to the telescoping conveyor; and
   a controller configured to:
      cause the moveable frame to move the suction cup support to a first vertical position; and
      cause the first suction cup assembly to engage a first package.

17. The package unloading system of claim 16, wherein the first suction cup assembly is disposed in an upper row of the suction cup support, and the second cup assembly is disposed in a lower row of the suction cup support, and wherein the controller is further configured to:
   determine that the first suction cup assembly is engaged;
   determine that the second suction cup assembly is engaged;
   cause the first suction cup assembly to retract from the first position to the second position; and
   cause the second suction cup assembly to retract from the first position to the second position after the first suction cup assembly is retracted to the second position.

18. The package unloading system of claim 17, wherein the controller is further configured to:
   cause the first suction cup assembly to extend from the second position to the first position while the second suction cup assembly is in the second position.

19. The package unloading system of claim 16, further comprising:
   a curtain coupled to the suction cup support, the curtain configured to guide packages onto the angled conveyor;
   wherein the curtain has a first length that is greater than a distance between the suction cup support and the angled conveyor when the suction cup support is disposed at a maximum height position.

20. The package unloading system of claim 16, wherein the telescoping conveyor comprises a first portion and a second portion that moves relative to the first portion; and
   wherein the moveable frame is coupled to the second portion of the telescoping conveyor, such that the moveable frame moves with respect to the first portion.

* * * * *